United States Patent
Oehler et al.

[11] Patent Number: 6,086,164
[45] Date of Patent: *Jul. 11, 2000

[54] MAGNET VALVE WITH PRESSURE LIMITATION FOR SLIP-CONTROLLED MOTOR VEHICLE BRAKE SYSTEMS

[75] Inventors: Martin Oehler, Leingarten; Guenther Hohl; Hans-Peter Huebner, both of Stuttgart; Norbert Mittwollen, Markgroeningen, all of Germany

[73] Assignee: Robert Bosch GmbH, Stuttgart, Germany

[*] Notice: This patent is subject to a terminal disclaimer.

[21] Appl. No.: 08/817,975

[22] PCT Filed: Oct. 10, 1995

[86] PCT No.: PCT/DE95/01386

§ 371 Date: Apr. 28, 1997

§ 102(e) Date: Apr. 28, 1997

[87] PCT Pub. No.: WO96/13414

PCT Pub. Date: May 9, 1996

[30] Foreign Application Priority Data

Oct. 27, 1994 [DE] Germany .................. 44 38 336

[51] Int. Cl.$^7$ .................. B60T 8/36; B60T 8/50; F16K 31/06
[52] U.S. Cl. .................. 303/119.2; 303/900; 303/901; 303/113.1
[58] Field of Search .................. 303/119.2, 119.3, 303/113.1, 900, 901; 251/129.02, 117, 129.15, 129.21, 129.22, 129.01, 129.08, 83; 137/596.17, 627.5, 625.65, 529; 335/274, 260

[56] References Cited

U.S. PATENT DOCUMENTS

| | | | |
|---|---|---|---|
| 3,880,476 | 4/1975 | Belart et al. | 303/119.2 |
| 3,970,111 | 7/1976 | Brüne et al. | 137/596.17 |
| 4,919,497 | 4/1990 | Kaes . | |
| 5,076,538 | 12/1991 | Mohr et al. | 251/129.02 |
| 5,370,450 | 12/1994 | Volz et al. | 303/119.2 |
| 5,476,243 | 12/1995 | Oehler et al. | 251/129.02 |
| 5,496,100 | 3/1996 | Schmid | 303/119.2 |
| 5,630,569 | 5/1997 | Oehler et al. | 251/129.15 |
| 5,645,325 | 7/1997 | Mueller et al. | 303/119.2 |
| 5,649,748 | 7/1997 | Oehler et al. | 303/119.2 |
| 5,669,675 | 9/1997 | Mueller et al. | 303/900 |
| 5,673,980 | 10/1997 | Schwarz et al. | 303/119.2 |
| 5,725,289 | 3/1998 | Mueller et al. | 303/119.2 |

FOREIGN PATENT DOCUMENTS

| | | |
|---|---|---|
| 423755 | 4/1991 | European Pat. Off. . |
| 3529134 | 2/1987 | Germany . |
| 3802648 | 8/1989 | Germany . |
| 4035817 | 5/1992 | Germany . |
| 4041506 | 6/1992 | Germany . |
| 4234749 | 4/1994 | Germany . |
| 9410487 | 5/1994 | WIPO . |
| 9508461 | 3/1995 | WIPO . |
| 9518030 | 7/1995 | WIPO . |

*Primary Examiner*—Douglas C. Butler
*Attorney, Agent, or Firm*—Edwin E Greigg; Ronald E. Greigg

[57] ABSTRACT

A magnet valve with low noise upon shutoff from the pressure limiting function. The magnet valve has a two-part valve tappet, whose inner valve tappet part has the closing member of a seat valve. The closing member is circumferentially engaged in spaced-apart fashion, forming a gap space, by a tubular portion of the outer valve tappet part. From the gap space, a pressure fluid conduit leads to a control chamber, which is located between the face end, remote from the seat valve, of a magnet armature that cooperates with the valve tappet, and a valve dome. Upon shutoff of the magnet valve, the seat valve changes from its closing position to a partly open position, in which dynamic pressure in the gap space becomes operative and is transmitted through the pressure fluid conduit into the control chamber. The hydraulic force that is operative there on the magnet armature acts counter to the opening forces of the magnet valve and slows down its opening motion. Because of the thus-throttled flow of pressure fluid through the seat valve, a pressure surge is averted. The magnet valve can be used in slip-controlled motor vehicle brake systems.

9 Claims, 2 Drawing Sheets

6,086,164

MAGNET VALVE WITH PRESSURE LIMITATION FOR SLIP-CONTROLLED MOTOR VEHICLE BRAKE SYSTEMS

PRIOR ART

The invention is based on a magnet valve for slip-controlled motor vehicle brake systems.

One such magnet valve is already known (German Patent Disclosure DE 42 34 749 A1) U.S. Pat. No. 5,496,100, which in slip-controlled brake systems of motor vehicles is disposed in a brake line between the master cylinder and the compression side of a high-pressure pump that pumps into the brake line, as described in the German Patent Reference DE 40 41 506 A1 U.S. Pat. No. 5,167,442. In ASR traction control, the magnet valve is switched into its closing position and the pressure limiting function is activated. Once the pump pressure exceeds the opening pressure of the valve, the seat valve moves counter to the force of the pressure limiting spring into the partly open position, so that pressure fluid can flow out to the master cylinder. Because the pump operation is pulsating, pressure surges arise in the downstream portion of the brake line and can cause irritating noise in the motor vehicle interior. The pressure surge, however, that occurs when the valve is switched off from the closing position to the open position, is especially irritating.

ADVANTAGES OF THE INVENTION

The magnet valve according to the invention has the advantage over the prior art that by the shaping of the valve seat, closing member and tubular portion of the outer valve tappet part at the transition of the seat valve from the closing position to the partly open position, a flow of pressure fluid into the gap space is brought about, which causes a dynamic pressure there that is transmitted through the pressure fluid conduit into the control chamber and exerts a force on the magnet armature which counteracts the hydraulic opening force and thus greatly slows down the process of opening of the seat valve to the open position, As a result, the volumetric flow of pressure fluid through the seat valve can increase only in throttled fashion, so that at most a highly attenuated pressure surge becomes operative in the downstream portion of the brake line. Hence the noise behavior of the brake system upon shut off of the magnet valve is greatly improved. But even with effective pressure limitation, a considerable reduction in noise is attained by the flow stabilization resulting from a defined flow guidance.

Further advantageous features of and improvements to the magnet valve disclosed herein are possible with the provisions recited hereinafter.

Suitable forms for the seat valve region are disclosed. These forms can be achieved at little production cost.

With the provision recited herein, a safe transmission of pressure to the control chamber is achieved.

From a technical production standpoint, skewed positions between the magnet armature and the valve tappet can be tolerated since they do not impair the tightness of the pressure fluid conduit.

The further embodiment of the invention disclosed herein is advantageous because as a result in a simple way a separation in terms of pressure of the control chamber from the valve dome interior toward the tappet is created.

BRIEF DESCRIPTION OF THE DRAWINGS

One exemplary embodiment of the invention is shown in simplified form in the drawing and described in further detail in the ensuing description.

DESCRIPTION OF THE EXEMPLARY EMBODIMENT

Figure 1:
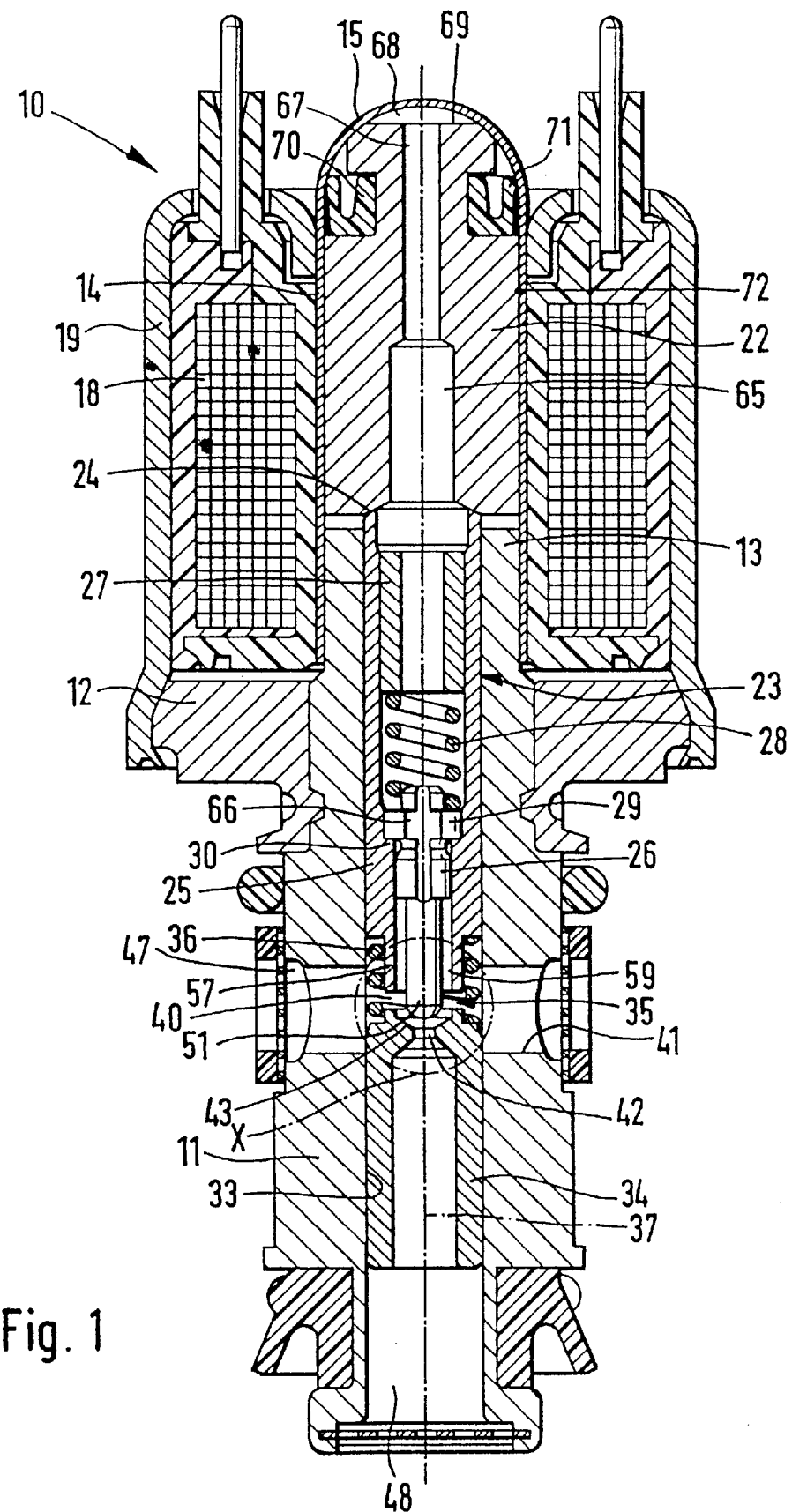
FIG. 1 is a longitudinal section through a magnet valve.

The magnet valve 10 shown in FIG. 1, with pressure limitation, is intended for use in slip-controlled brake systems of motor vehicles. The magnet valve 10 has a valve housing 11, which is meant to be received in a valve block, not shown, and is solidly joined to a yoke disk 12. The valve housing 11 is continued outward, past the yoke disk 12, in the form of a pole core 13. A closed, tubular valve dome 14 is mounted on the pole core 13. It is tightly joined to the pole core 13 by welding. Remote from the pole core, the valve dome 14 is terminated with a hemispherical cap 15.

The valve dome 14 is engaged circumferentially by an annular magnet coil 18. A bell-shaped housing 19 engages the valve dome 14 on one side; on the other, this housing is joined to the yoke disk 12.

In the valve dome 14 closed on the coil side, a substantially circular-cylindrical magnet armature 22 is received so as to be longitudinally movable. A valve tappet 23 is braced against the magnet armature 22. The magnet armature 22 and the valve tappet 23 are separate components, which engage one another in a sealing seat 24. The valve tappet 23 has a tubular outer valve tappet part 25, in which a second, inner valve tappet part 26 is guided longitudinally movably. Toward the magnet armature, a press-fit sleeve 27 is seated in the outer valve tappet part 25. A pressure limiting spring 28 in the form of a helical compression spring is located in the valve tappet 23 between the press-fit sleeve 27 of the outer valve tappet part 25 and the inner valve tappet part 26. With initial tension, this spring on one end engages the press-fit sleeve 27 and on the other a collar 29 of the inner valve tappet part 26, which in turn is braced on a shoulder 30 of the outer valve tappet part 25.

The valve tappet 23 is received longitudinally movably in a continuous bore 33 of the valve housing 11. Remote from the pole core, a valve body 34 of a seat valve 35 is press-fitted into the housing bore 33. A restoring spring 36 engages the valve body 34 on the one hand and the outer valve tappet part 25 on the other, the valve tappet 26 is supported on the magnet armature 22. The valve body 34, parts 25 and 27 of the valve tappet 26, and the magnet armature 22 are disposed in the longitudinal axis 37 of the magnet valve 10.

The seat valve 35 is located in the region of a valve chamber 40, which is formed by the bore 33 and a transverse bore 41 of the valve housing 11. The seat valve 35 has a valve seat 43 of hollow-conical shape (FIGS. 2 and 3) that is formed in the valve body 34 and encompasses a valve opening 42. The valve seat 43 is located in a straight, circular-cylindrical indentation 44 of the valve body 34. The indentation 44 is defined toward the valve chamber 40, downstream of a sharp edge 45, by a face end 46 of the valve body 34 that extends at right angles to the longitudinal axis 37 of the valve. While the valve chamber 40 communicates through the transverse bore 41 with a pressure fluid inlet 47, the valve opening 42 is connected, through the through-bored valve body 34, to a pressure fluid outlet 48 of the magnet valve 10. The pressure fluid inlet 47 communicates with a master cylinder, and the pressure fluid outlet 48 communicates with at least one wheel brake cylinder and the high-pressure side of a return pump of the hydraulic motor vehicle brake system, not shown, which is shown for instance from the aforementioned reference DE 40 41 506 A1 U.S. Pat. No. 5,167,442.

The seat valve 35 has a closing member 51 which cooperates with the valve seat 43 and is formed by a recessed circular-cylindrical portion 52 of reduced diameter of the inner valve tappet part 27. Toward the valve seat 43, the portion 52 changes over, forming a sharp edge 53, into a spherical segment 54 of low height. In the open position of the seat valve 35 shown in FIG. 2, the spherical segment 54 assumes a position approximately in the region of the face end 46 of the valve body 44.

Figure 2:
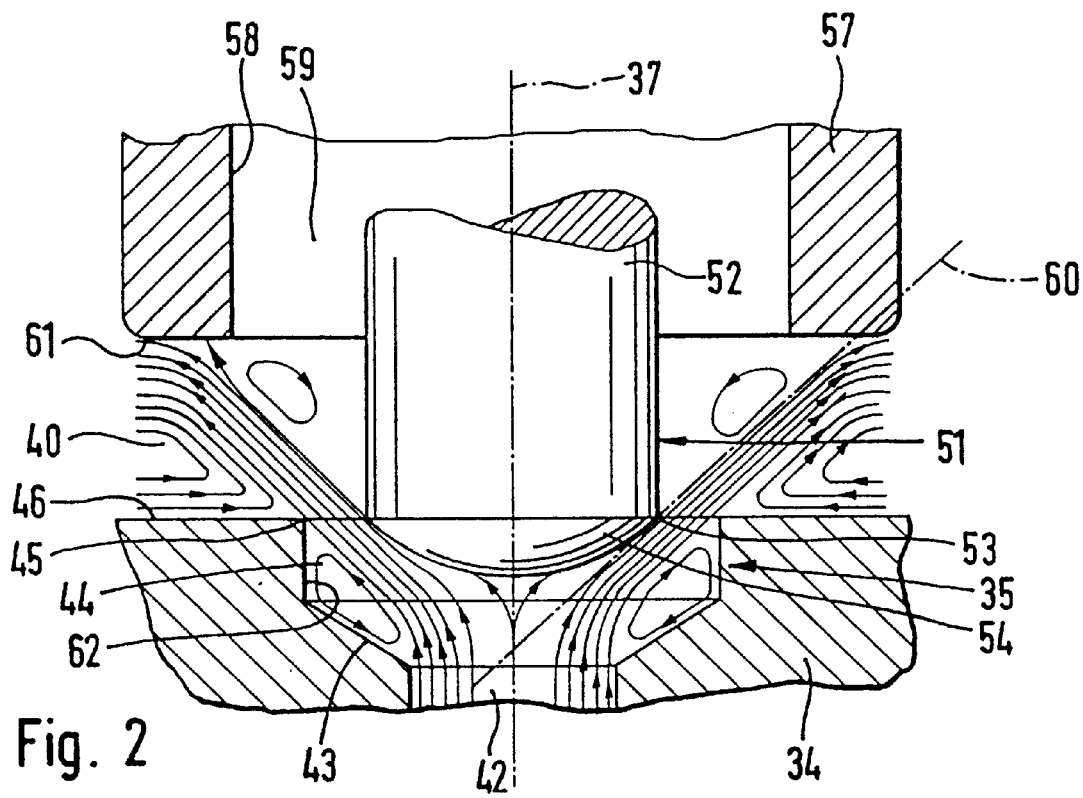
FIGS. 2 and 3 show flow courses in the seat valve region, marked X in FIG. 1, of the valve as the valve assumes its open position (FIG. 2) and its partly open position (FIG. 3).

The portion 52 of the inner valve tappet part 27 is engaged circumferentially by a tubular portion 57 of the outer valve tappet part 25. The tubular portion 57 extends with radial spacing from the circular-cylindrical portion 52; that is, the inner jacket face 58 of the tubular portion is spaced apart by a constant distance from the circular-cylindrical portion. As a result, a gap space 59 is formed between the tubular portion 57 and the circular-cylindrical portion 52 and is open toward the valve chamber 40. The tubular portion 57 also has an axial offset relative to the spherical segment 54. This offset is dimensioned such that a tangent 60, located in the peripheral region of the spherical segment 54 and intersecting the longitudinal axis 37 of the valve 10 at an angle of approximately 45°, meets the face end 61 of the tubular portion 57 that extends at right angles to the longitudinal axis 37 of the valve, as can be seen in FIG. 2. In a departure from this, the axial offset or the outer diameter of the tubular portion 57 may be dimensioned such that the tangent 60 extends beyond the portion past the face end 61. As FIG. 2 also shows, in the open position of the seat valve 35 the tangent 60 extends past the face-end edge 45 of the indentation 44 in the valve body 34. The indentation 44 has a diameter that is equal to or less than the inside diameter of the tubular portion 57; in the exemplary embodiment shown, it is approximately between that and the portion 52 of the inner valve tappet part 27. In the partly open position of the seat valve 35 shown in FIG. 3, the tangent 60 conversely meets the jacket wall 62 of the indentation 44. In the partly open position, the tubular portion 57 assumes a considerably greater axial spacing from the face end 46 of the valve body 34 than in the open position.

A pressure fluid conduit 65 originates at the gap space 59 and extends essentially in the longitudinal axis 37 of the valve. Only on the inner valve tappet part 26 is the pressure fluid conduit 65 embodied as at least one recess 66, following the circular-cylindrical portion 52, in the form of a longitudinally extending notch or groove. Following the recess 66, the pressure fluid conduit 65 extends in the interior of the outer valve tappet part 25 and of the press-fit sleeve 27 and changes over, after the sealing seat 24, into a longitudinal bore 67 of the magnet armature 22. In the cap 15 of the valve dome 14, the pressure fluid conduit 65 opens out into a control chamber 68, which is defined on one side by the cap 15 and on the other by the face end 69, remote from the seat valve, of the magnet armature 22. The control chamber 68 is sealed off from the valve dome 14 circumferentially of the magnet armature 22. To that end, the magnet armature receives a sealing cuff 70, whose sealing lip 71, engaging the valve dome 14, is oriented toward the control chamber 68. Instead of the sealing cuff 70, the magnet armature 22 may also be sealed off from the valve dome with a gap seal 72.

The mode of operation of the magnet valve 10 is as follows:

In braking without slip control, the seat valve 35, assuming its open position, has a flow of pressure fluid through the valve from the pressure fluid inlet 47 to the pressure fluid outlet 48 upon pressure buildup in the wheel brake cylinders, and in the opposite direction upon a pressure reduction.

In brake pressure reduction, the pressure fluid takes a course through the seat valve 35 into the valve chamber 40, as represented by flow lines in FIG. 2. The pressure fluid flowing through the valve seat 44 from the valve opening 42 is deflected approximately tangentially by the spherical segment 54 of the closing member 51; the flow separates at the sharp edge 53 of the closing member 51. The pressure fluid leaves the indentation 45 in the direction of the tangent 60, and part of the flow meets the face end 61 of the tubular portion 57 of the outer valve tappet part 25. There, the pressure fluid undergoes a radial deflection into the valve chamber 40, from which it flows away to the pressure fluid inlet 47.

In braking for the purpose of ASR traction control, current supplied to the magnet coil 18 generates a magnetic field, which exerts a force on the magnet armature 22 and displaces the armature toward the valve body 34. The valve tappet 23 supported on the magnet armature 22 is carried along in the process, counter to the force of the restoring spring 36. In the course of motion of the magnet armature 22, the closing member 51 meets the valve seat 43 of the valve body 34. This terminates the motion of the inner valve tappet part 27. The seat 35 assumes a closing position. Since the magnet armature 22 has not executed its full stroke (the strokes of the seat valve 35 and magnet armature 22 are not drawn to scale in FIG. 1) and therefore continues to move toward the valve body 34, the collar 29 of the inner valve tappet part 27 is lifted, overcoming the biasing force of the pressure limiting spring 28, from the shoulder 30 of the outer valve tappet part 25. While until now the flow of force of the pressure limiting spring 28 was a closed circuit via the collar of the inner valve tappet part 27, the outer valve tappet part 25 and the pressure-fit sleeve 24, at the end of the armature stroke the pressure limiting spring 28 exerts an axial force on the inner valve tappet part 27, with which this tappet part, by means of its closing member 51, engages the valve seat 43 of the valve body 34. The force of the pressure limiting spring 28 now acts as a closing force of the seat valve 35, which closing force determines the opening pressure of the magnet valve 10.

Figure 3:
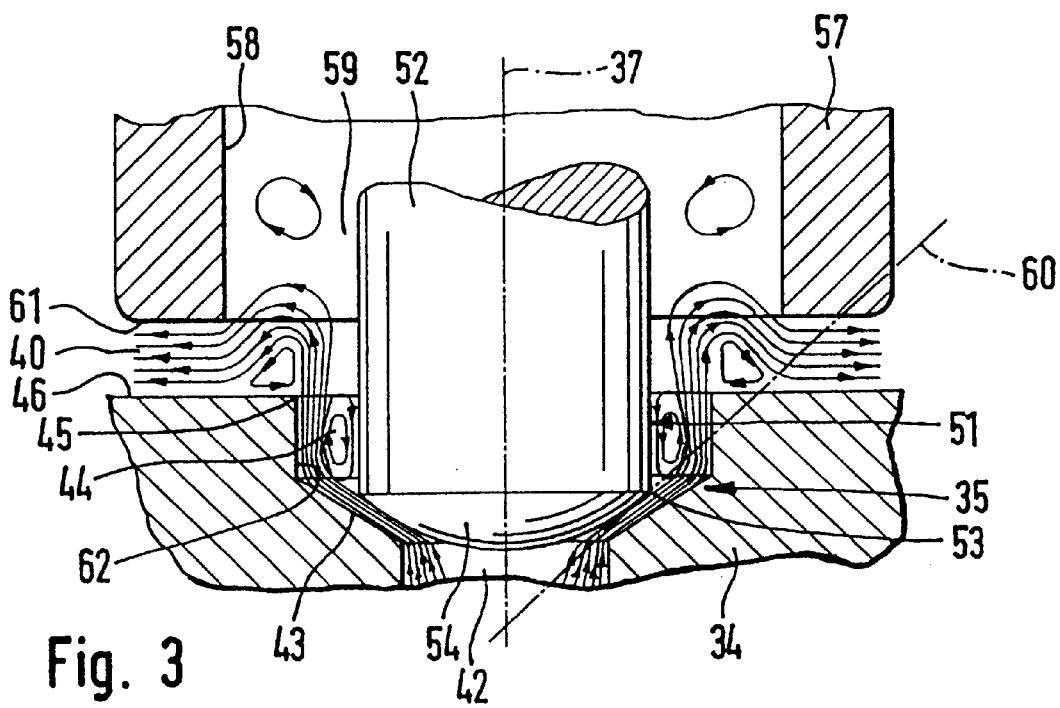

When the closing member 51 engages the valve seat 43, the magnet valve 10 thus performs the function of a shutoff valve with a pressure-limiting action with respect to the part of the brake system with the wheel brake cylinders. If the return pump exceeds the opening pressure of the magnet valve 10, then the pressure limiting function becomes operative. The closing member 51 lifts from the valve seat 43 counter to the force of the pressure limiting spring 28 and assumes the partly open position of the seat valve 35 as shown in FIG. 3.

In this position, the flow lines on passing through the narrow gap between the valve seat 43 and the spherical segment 54 take a course corresponding to the tangent 60, and on leaving the valve seat they meet the jacket wall 62 of the indentation 44. Here, the flow lines undergo axial deflection, so that some of them on leaving the indentation 44 pass into the gap space 59 between the closing member 51 and the tubular portion 57 and generate a dynamic pressure there that acts circumferentially on the circular-cylindrical portion 52 of the closing member 51. This defined flow guidance suppresses possible instabilities in the existing stream flow, so that the closing member 31 is not acted upon by alternating pulsating forces and therefore is not induced to vibrate. Moreover, the dynamic pressure is transmitted through the pressure fluid conduit 65 into the control chamber 68, where it generates a hydraulic force on the magnet armature 22 that is oriented counter to the seat valve 35. However, since the magnet armature 22 is braced against the pole core 13, this force has no effect on the seat valve 35. The dynamic pressure deflects the flow of pressure fluid out of the gap space 59, so that the pressure fluid takes a radial course between the two face ends 46 and 61 of the valve body 34 and tubular portion 57 in the direction of the pressure fluid inlet 47.

When the current supply to the magnet coil 18 is terminated, the magnetic field collapses, and the magnet armature 22, by the action of the pressure limiting spring 28 and the restoring spring 36, is moved together with the valve tappet 23 in the direction of the cap 15 of the valve dome 14. As the seat valve 35 opens, pressure fluid flows through the valve seat 43 as shown in FIG. 3 and generates a dynamic pressure in the cap space 59 that is transmitted through the pressure fluid conduit 65 into the control chamber 68. The hydraulic force brought about there acts upon the magnet armature 22 counter to its direction of motion and partly compensates for the opening forces acting upon the valve tappet 23. The result is a slowed-down opening motion of the magnet valve 10, at least as long as the seat valve 35 is in the partly open position. Since in the partly open position the pressure fluid can flow through the seat valve 35 only in throttled fashion, the appearance of a pressure surge downstream is largely averted. As the valve stroke lengthens, the effect of the dynamic pressure is reduced, so that this seat valve 35 can assume its open position, in which the flow of pressure fluid through it is largely unthrottled, as in the illustration of FIG. 2.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A magnet valve (10) with pressure limitation for slip-controlled motor vehicle brake systems, comprising a valve dome (14);
   a magnet armature (22) is received longitudinally movably in said valve dome (14);
   the valve dome (14) is circumferentially engaged by a magnet coil (18);
   a valve tappet (23) is movable with the magnet armature (22);
   a seat valve (35) is provided, which has a valve seat (43) in a valve body (34), the valve seat surrounding a valve opening (42), and a closing member (51) cooperates with said valve body;
   the seat valve (35) has a spherical-conical configuration, with the valve seat (43) embodied conically and the closing member (51) is embodied spherically on a face end of an inner part (26);
   the closing member (51) is disposed on the inner part (26) of the valve tappet (23), which in turn is formed of two coaxially intermeshing outer and inner parts (25, 26);
   the valve tappet (23) is movable axially by magnetic force into the closing position and by the force of a restoring spring (36) into the open position of the seat valve (35);
   a pressure limiting spring (28) is disposed between the inner part (26) and the outer part (25) of the valve tappet (23), braced axially against the valve tappet, and counter to the force of this spring the inner valve tappet part (26) is axially displaceable relative to the outer valve tappet part (25) out of the closing position into a partly open position of the seat valve (35);
   the valve seat (43) is located in an at least approximately straight, circular indentation (44) of the valve body (34), which toward the tappet is defined with a sharp edge (45) by an at least approximately radially extending face end (46) of the valve body;
   the closing member (51), downstream of a face-end spherical segment (54), changes over, forming a sharp edge (53), into a straight circular-cylindrical portion (52) of the inner valve tappet part (26);
   the portion (52) of the inner valve tappet part (26) is circumferentially engaged by a tubular portion (57) of the outer valve tappet part (25), forming a gap space (59) with both radial spacing and an axial offset relative to the spherical segment (54);
   the axial offset of the tubular portion (57) is dimensioned such that a tangent (60), placed in the peripheral region of the spherical segment (54) and intersecting the longitudinal axis (37) of the valve, meets the face end (61) of the tubular portion (57) or runs past this portion on the outside on the face end;
   in the open position of the seat valve (35), this spherical segment (54) of the closing member (51) is located at least approximately in the region of the valve body face end (46), so that the tangent (60) runs past the face-end edge (45) of the indentation (44) of the valve body (34);
   in the partly open position of the seat valve (35), in which the closing member (51) is lifted from the valve seat (43) counter to the force of the pressure limiting spring (28), the tangent (60) meets the jacket wall (62) of the indentation (44);
   from the gap space (59), a pressure fluid conduit (65) leads outward to a control chamber (68), which is located between the face end (69) of the magnet armature (22) remote from the seat valve and the valve dome (14);
   the control chamber (68) is sealed off circumferentially of the magnet armature (22).

2. A magnet valve in accordance with claim 1, in which the tangent (60) forms an angle between 30° and 60°, with the longitudinal axis (37) of the valve.

3. A magnet valve in accordance with claim 1, in which the indentation (44) of the valve body (34) has a diameter that is equal to or smaller than an inside diameter of the tubular portion (57) of the outer valve tappet part (25).

4. A magnet valve in accordance with claim 3, in which the diameter of the indentation (44) is at least approximately midway between the diameter of a portion (52) of the inner valve tappet part (26) and the inside diameter of the tubular portion (57) of the outer valve tappet part (25).

5. A magnet valve in accordance with claim 1, in which the indentation (44) of the valve body (34), the portion (52) of the inner valve tappet part (26), and the inner jacket face (58) of the tubular portion (57) of the outer valve tappet part (25) are defined concentrically, and the face ends (46, 61) of the valve body (34) and of the tubular portion (57) are located in planes extending at right angles to the longitudinal axis (37) of the valve.

6. A magnet valve in accordance with claim 1, in which the pressure fluid conduit (65) is embodied by a longitudinal bore (67) of the magnet armature (22), by an interior of the outer valve tappet part (25), and by a recess (66) of the inner valve tappet part (26).

7. A magnet valve in accordance with claim 6, in which the magnet armature (22) and the valve tappet (23) are embodied as separate components, which engage one another under the influence of the restoring spring (36) in a sealing seat (24) that encompasses the pressure fluid conduit (65).

8. A valve in accordance with claim 1, in which the magnet armature (22) carries a sealing cuff (70), whose sealing lip (71), engaging the valve dome (14), is aimed at the control chamber (68).

9. A valve in accordance with claim 1, in which the magnet armature (22) is sealed off from the valve dome (14) by a gap seal (72).

\* \* \* \* \*